United States Patent
Kuenster et al.

[11] Patent Number: 6,140,981
[45] Date of Patent: Oct. 31, 2000

[54] BODY-MOUNTABLE DISPLAY SYSTEM

[76] Inventors: Gordon B. Kuenster, 1603 Evergreen Point Rd., Medina, Wash. 98039; Kenneth H. Dickenson, Jr., 6624 128th Ave., SE., Bellevue, Wash. 98006

[21] Appl. No.: 08/949,255

[22] Filed: Oct. 13, 1997

Related U.S. Application Data

[63] Continuation-in-part of application No. 08/821,696, Mar. 20, 1997.

[51] Int. Cl.[7] .................................................... G09G 5/00
[52] U.S. Cl. .................................. 345/8; 345/7; 359/630
[58] Field of Search .................................. 345/7, 8, 156; 359/630, 631

[56] References Cited

U.S. PATENT DOCUMENTS

| | | | |
|---|---|---|---|
| 4,825,471 | 5/1989 | Jennings | 2/94 |
| 4,869,575 | 9/1989 | Kubik | 350/174 |
| 4,934,773 | 6/1990 | Becker | 359/214 |
| 5,023,905 | 6/1991 | Wells et al. | 379/96 |
| 5,078,134 | 1/1992 | Heilman et al. | 128/421 |
| 5,208,417 | 5/1993 | Langer et al. | 89/41.06 |
| 5,281,957 | 1/1994 | Schoolman | 345/8 |
| 5,305,124 | 4/1994 | Chern et al. | 359/13 |
| 5,311,203 | 5/1994 | Norton | 345/7 |
| 5,408,346 | 4/1995 | Trissel et al. | 359/65 |
| 5,416,310 | 5/1995 | Little | 235/462 |
| 5,416,730 | 5/1995 | Lookofsky | 364/708.1 |
| 5,539,578 | 7/1996 | Togino et al. | 359/630 |
| 5,570,944 | 11/1996 | Seder et al. | 353/98 |
| 5,581,492 | 12/1996 | Janik | 364/708.1 |
| 5,625,372 | 4/1997 | Hildebrand et al. | 345/8 |
| 5,774,338 | 6/1998 | Wessling, III | 361/730 |
| 5,798,907 | 10/1998 | Janik | 361/683 |
| 5,815,126 | 9/1998 | Fan et al. | 345/8 |
| 5,912,653 | 6/1999 | Fitch | 345/87 |

*Primary Examiner*—Vijay Shankar
*Assistant Examiner*—Mansour M. Said
*Attorney, Agent, or Firm*—Wood, Phillips, VanSanten, Clark & Mortimer

[57] ABSTRACT

A body-mountable display system having a first structure for receiving an input signal and producing a video output in response thereto, a garment wearable by a user, and a second structure for operatively connecting the first structure to the garment to allow the first structure to be universally repositionable relative to the garment. The first structure includes a hand-holdable portable display including a housing having a viewing aperture for viewing the video output. The second structure includes a flexible element having spaced ends with one end pivotally mounted to the garment and the other end including a structure for detachably mounting the portable display to the flexible element. The portable display may include a portable virtual image display for focusing the video output at one of (a) infinity and (b) a desired finite distance viewable by an observer. The body-mountable display system may include, in combination, a computer producing the input signal. The body-mountable display system may include a computer mouse formed on the portable display or garment for controlling operation of the computer.

20 Claims, 11 Drawing Sheets

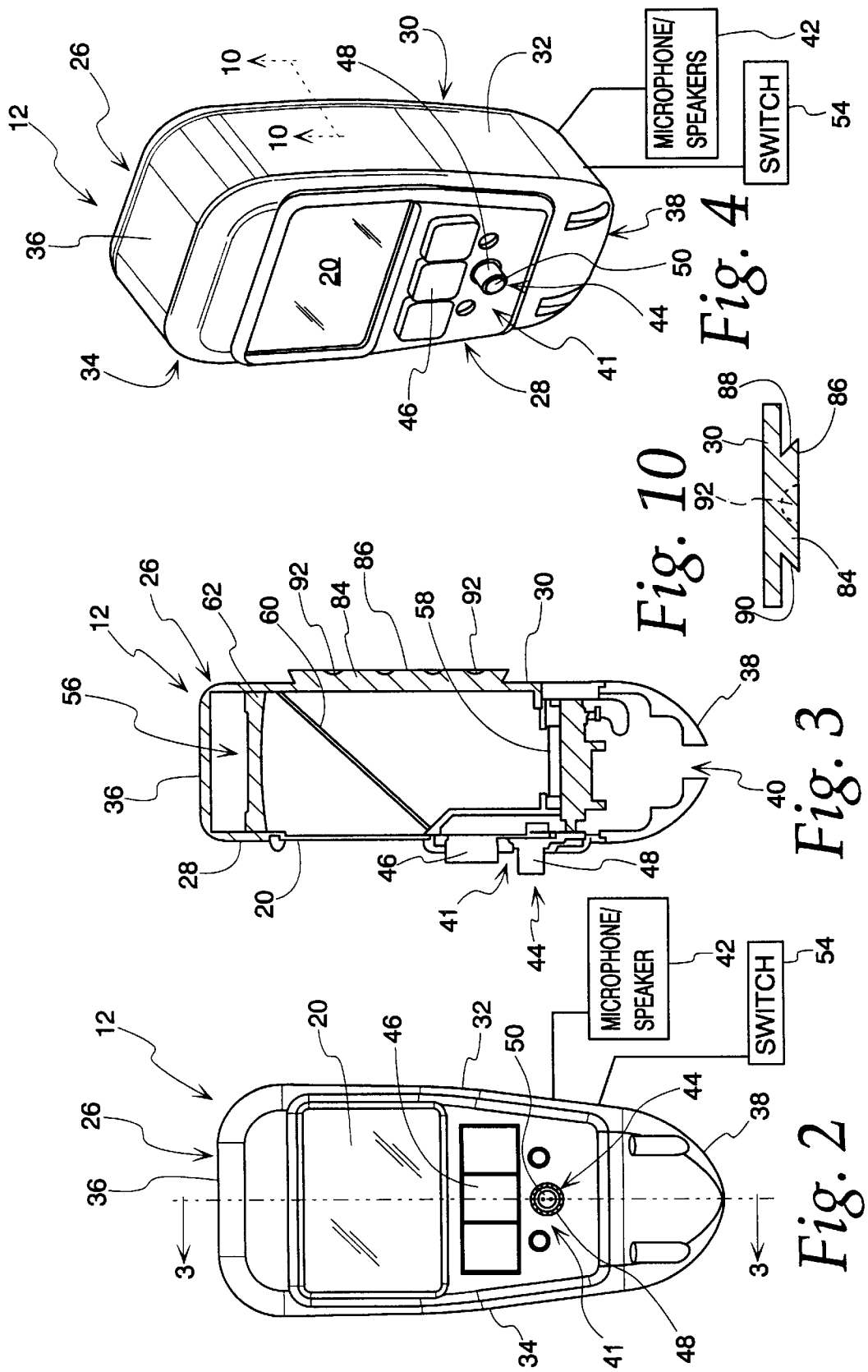

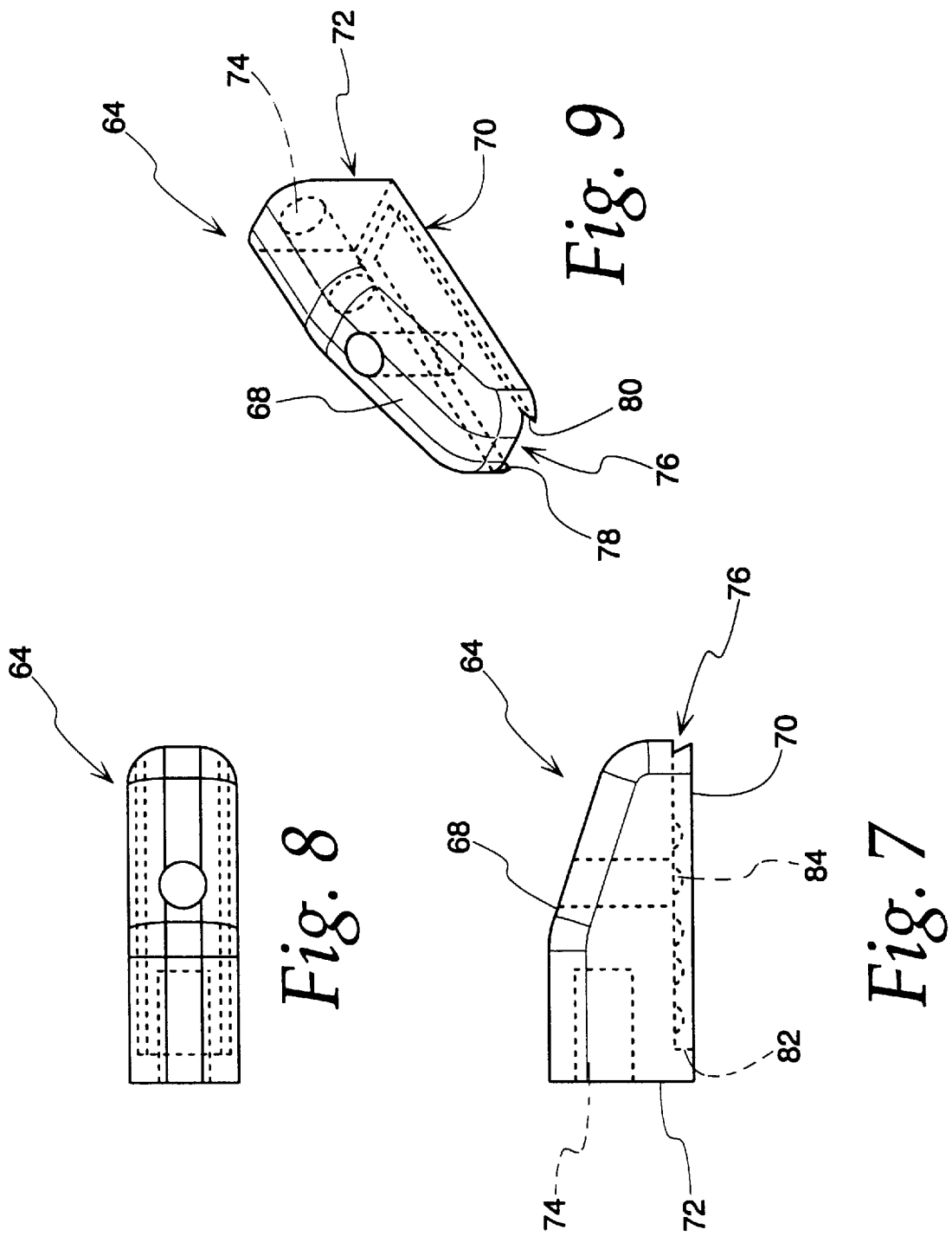

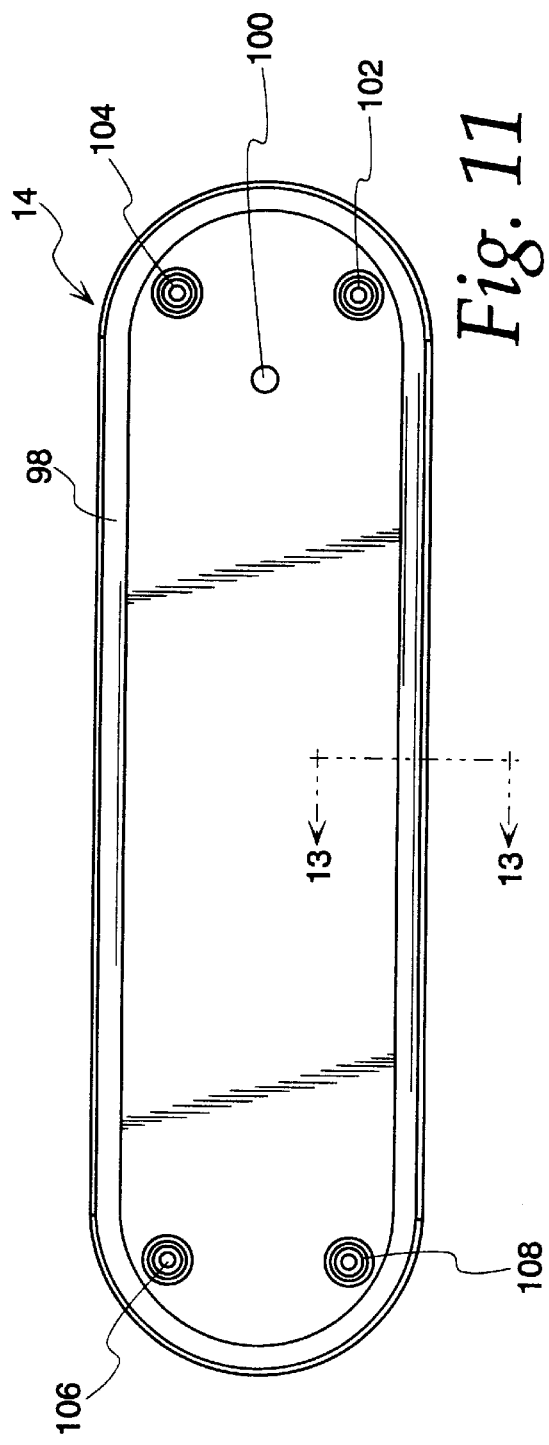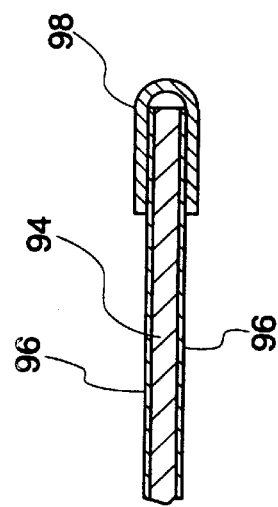

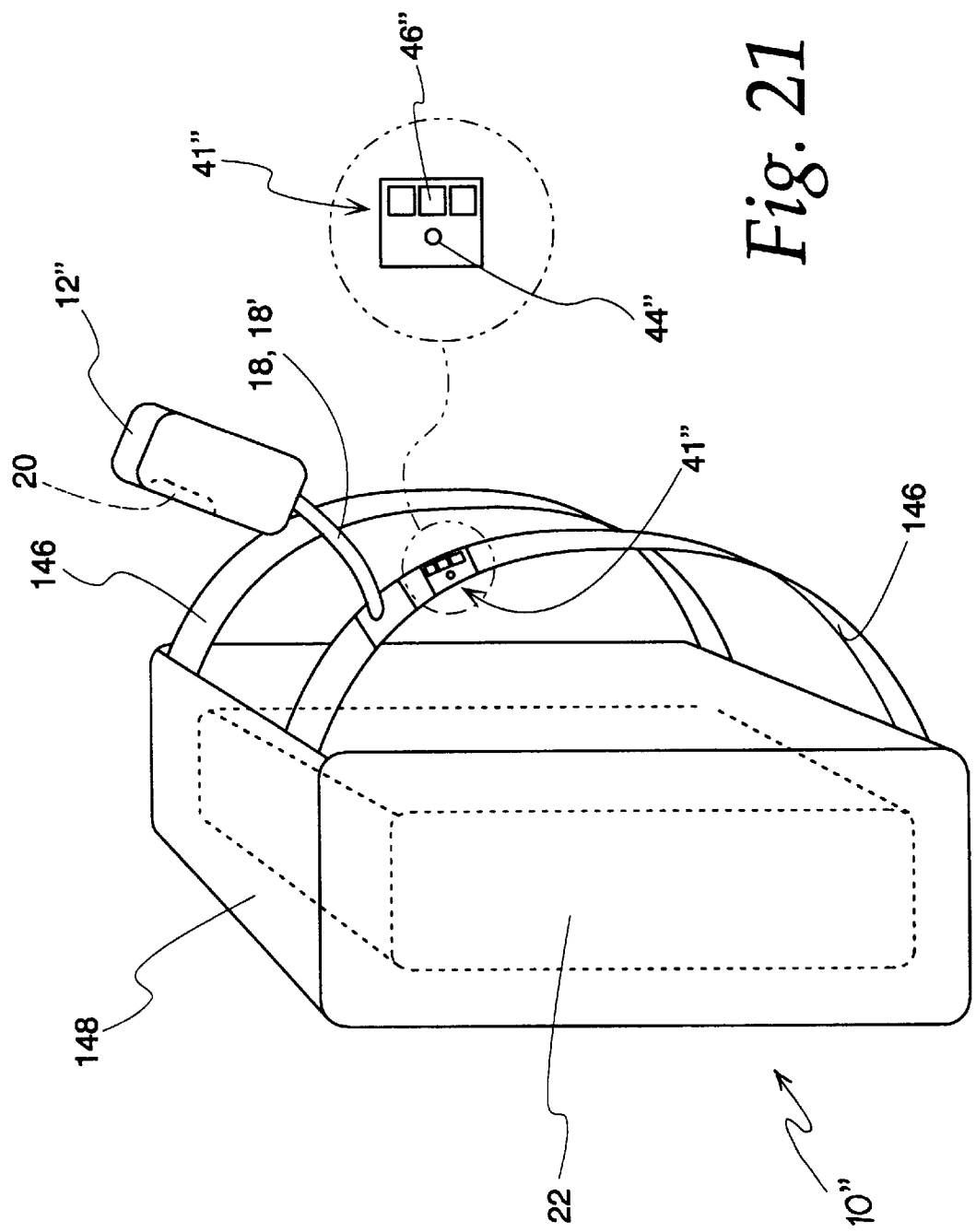

BODY-MOUNTABLE DISPLAY SYSTEM

CROSS-REFERENCE TO RELATED APPLICATION

This application is a continuation-in-part of application Ser. No. 08/821,696, filed Mar. 20, 1997 entitled "Body-Mountable Display System".

FIELD OF THE INVENTION

The present invention relates to a body-mountable display system and, more particularly, to a display system detachably and/or variably secured to a garment wearable by a user.

BACKGROUND OF THE INVENTION

Various body-worn or body-mountable computer and computer-type devices are currently in existence. These devices generally include head-mounted displays which allow the user to perform tasks with both hands while monitoring the display. Often times, the head-mounted displays are mounted to goggles, glasses and/or a helmet, which is worn on the head of a user. The head-mounted displays can be uncomfortable, and may produce undue strain on the neck muscles of a user. Further, the head-mounted displays limit a user's visibility when placed in an operative viewing position. This limited visibility in turn limits a user's ability to perform certain tasks in which visibility is required. Accordingly, such head-mounted displays would not be practical, for example, in military applications where a soldier would be required to perform a variety of tasks while easily and simultaneously viewing both the display and his/her surroundings.

Alternatively, hand-held displays are being used which can be holstered or hung on the body when not in use. A disadvantage to the hand-held display is that it requires the use of at least one hand, and often times both. This places the user, requiring the use of both hands while monitoring the display, at a disadvantage. Further, the holstered display, when not in use, may interfere with the user's ability to perform certain tasks.

SUMMARY OF THE INVENTION

The present invention is specifically directed to overcoming one or more of the above-enumerated problems in a novel and simple manner.

The present invention is directed toward a body-mountable display system including a first structure for receiving an input signal and producing a video output in response thereto, a garment wearable by a user, and a second structure for operatively connecting the first structure to the garment to allow the first structure to be universally repositionable relative to the garment.

The body-mountable display system may further include, in combination therewith, a computer that produces the input signal.

The first structure may include a hand-holdable portable display, and the second structure may include a structure for detachably mounting the portable display to the garment.

The second structure may include a flexible element having spaced ends with one end mounted to the garment and the other end including a structure for detachably mounting the portable display to the flexible element.

The portable display may include a housing having a viewing aperture for viewing the video output, and a manual control operably connected to the housing for selectively controlling the video output and operation of the computer.

The manual control may include a computer mouse including a track ball for universal positioning of a cursor on the video output, and a touch pad engageable by a user for activating the computer to perform certain functions relating to a location of the cursor on the video output.

The computer may have an audio interface, and the portable display may include an audio control operably connected to the housing for providing audio signals to the audio interface in response to receiving voice commands from a user for selectively controlling the video output and operation of the computer via the voice commands.

The audio display may include a microphone formed on the housing.

A switch may be provided selectively variable between (a) a first state wherein the computer mouse is enabled and (b) a second state wherein the audio control is enabled for selectively controlling the video output and operation of the computer.

The housing may include a front wall at which the viewing aperture is defined, a back wall and side walls. The flexible element may be detachably mounted to the housing at the back wall of the housing.

The portable display may include a raised tab formed on the back wall of the housing, and the structure for detachably mounting the portable display to the flexible element and may include a member attached to the other end of the flexible element having a cooperating slot for removably receiving the raised tab. The second structure may further include a dove-tail connection between the raised tab on the back wall of the housing and the cooperating slot on the member.

Cooperating detent structures may be provided on the raised tab and cooperating slot to allow the portable display to be releasably secured in a plurality of different positions relative to the member.

The video output may include a display image and the portable display may include a portable virtual image display for focusing the display image at one of (a) infinity and (b) a desired finite distance viewable by an observer.

The garment may substantially conform to and overlie a substantial area of a user's body.

The flexible element may include a gooseneck support to allow the portable display to be universally repositionable to an infinite number of different positions relative to the garment.

The garment may include a backpack having straps engageable by the user for operatively securing the backpack thereto.

The second structure may include a structure for detachably mounting the portable display to one of the straps of the backpack.

In an alternative embodiment of the present invention, a body-mountable display system is provided including a first structure for receiving an input signal and producing a video output in response thereto, a garment wearable by a user, and a second structure for operatively connecting the first structure to the garment to allow the first structure to be pivotable between in-use and storage positions relative to the garment.

The body-mountable display system may further include, in combination therewith, a computer that produces the input signal.

The first structure may include a hand-holdable portable display, and the second structure may include a structure for detachably mounting the portable display to the garment.

The second structure may include a connecting element having spaced ends with one end pivotably mounted to the garment and the other end including a structure for detachably mounting the portable display to the connecting element.

The connecting element may include a disc-shaped element having oppositely facing side walls and a central bore. The disc-shaped element may be operatively received in a channel defined by facing side walls formed in a base element attached to the garment, and pivotably mounted to the base element via a pin extending through the central bore and secured to the base element.

A securing structure may be provided operatively associated with the connecting element and garment for operatively securing the portable display in a plurality of pivoting positions relative to the garment.

The securing structure may include a plurality of detents formed in one of the opposing side walls of the base element and the oppositely facing side walls of the disc-shaped element, and a plurality of raised members formed in the other of the facing side walls of the base element and the oppositely facing side walls of the disc-shaped element. The plurality of detents and plurality of raised members cooperating during pivoting of the portable display to frictionally secure the portable display at a plurality of different pivoting positions relative to the garment.

The connecting element may include a flexible element universally repositionable to place the portable display in an infinite number of different positions relative to the garment in each different pivoting position.

The portable display may include a housing having a viewing aperture reviewing the video output. A shroud may be provided about the viewing aperture and extending from the housing.

A manual control may be provided operably connected to the garment for selectively controlling the video output and operation of the computer.

The manual control may include a computer mouse including a track ball for universal positioning of a cursor on the video output, and a touch pad engageable by a user for activating the computer to perform certain functions relating to a location of the cursor on the video output.

The garment may include a backpack having straps engageable by a user for operatively securing the backpack thereto. The computer mouse may be formed on one of the straps. The other end of the connecting element may be operably secured to one of the straps of the backpack.

The computer may include a portable computer disposed in the backpack.

Other aspects, objects and advantages of the present invention can be obtained from a study of the application, the drawings, and the appended claims.

BRIEF DESCRIPTION OF THE DRAWINGS

FIG. 2 is a front elevational view of the display;

FIG. 3 is a cross-sectional view of the display taken along line 3—3 of FIG. 2;

FIG. 4 is a perspective view of the display;

FIG. 7 is a plan view of the member releasably securing the display to the flexible element;

FIG. 8 is a top view of the member releasably securing the display to the flexible element;

FIG. 9 is a perspective view of the member releasably securing the display to the flexible element;

FIG. 10 is a cross-sectional view of the display taken along line 10—10 in FIG. 4;

FIG. 11 is a top view of the garment;

FIG. 12 is a side elevational view of the garment;

FIG. 13 is a cross-sectional view of the garment taken along line 13—13 in FIG. 11;

FIG. 21 is a perspective view of a body-mountable display system according to an alternative embodiment of the present invention including a display, a garment wearable by a user, a computer control attached to the garment, and a flexible element connected between the display and garment.

DETAILED DESCRIPTION OF THE PREFERRED EMBODIMENT

Figure 1:
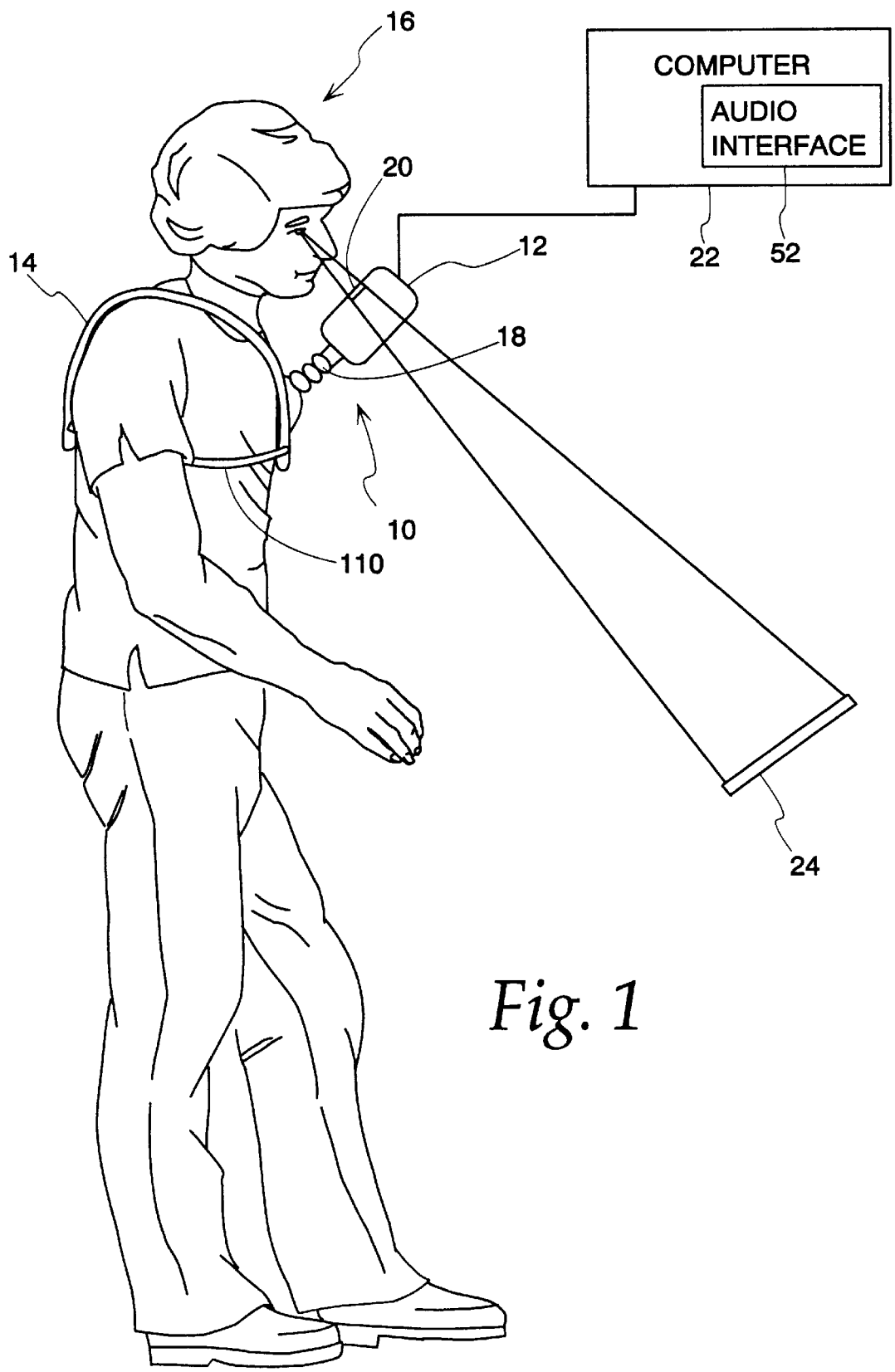
FIG. 1 is a perspective view of a body-mountable display system according to the present invention including a display, a garment wearable by a user, and a flexible element connected between the display and garment.

Referring to FIG. 1, a body-mountable display system is shown generally at 10. The display system 10 includes a display 12 attached to a garment 14 wearable by a user 16 via a flexible element 18. The flexible element 18 permits the user 16 to universally reposition the display 12 relative to the garment 14. This allows the user 16 to adjust the display 12 to a position for maximum readability through a viewing aperture 20 on the display 12, or to stow the display 12 out of the way when not in use. The user 16 is thus able to monitor the display 12 while simultaneously performing tasks with both hands. Generally, any occupation in which "hands-free" operation is desired can benefit from the body-mountable display system 10 of the present invention.

The display 12 operably interfaces with a computer 22. However, the display system 10 may be utilized with any device capable of outputting an audio and/or video signal. In a preferred embodiment, communication between the display 12 and computer 22 is accomplished via radio waves or other similar means. However, the invention also contemplates a cable connection (not shown) between the display 12 and the computer 22. The cable connection would most likely be utilized when the system components of the computer 22 are configured for carrying and/or securing on a garment, such as a vest and the like.

In one preferred form, the display 12 includes a virtual image display focusing an image 24 viewed through the viewing aperture 20 near infinity. With the display image 24 focused near infinity, the user 16 can focus on the image 24 with the display 12 at any distance from his/her eye without having to change eye focus. Changing the distance of the display 12 to the eye has a negligible effect on the overall focus. This permits the user 16 to bring the display 12 as close to the eye as is needed to reduce the effects of the sun or other bright lights on the display 12. Also, the virtual image display 12 will remain in focus regardless of the adjusted position of the display 12 or movement of the display 12 during walking or running.

FIGS. 2–4 depict one such virtual display 12. The display 12 consists of a housing 26 which includes a front wall 28, a back wall 30, side walls 32,34 and end walls 36,38. In the embodiment depicted in FIGS. 2–4, an opening 40 is provided in the end wall 38 for a cable connection of the display 12 to the computer 22. However, other connection configurations are also contemplated.

The front wall 28 of the housing 26 includes the viewing aperture 20 through which the image generated by the display 12 is viewable by an observer/user 16 as a display image 24 (see FIG. 1). The viewing aperture 20 preferably consists of a transparent material in a cut-out portion of the front wall 28 of the housing 26 to prevent dust and other foreign matter from entering the display 12. However, if so desired, the transparent material may be excluded. While the preferred embodiment contemplates focusing the image at infinity, imaging objects could be utilized which create the virtual image at any comfortable viewing distance and at any desired size.

The housing 26 is preferably made of a black ABS plastic and is designed to be light-tight and small. For example, in one embodiment of the invention, the housing 26 is approximately 96.25 mm by 59.5 mm with a depth of 41.5 mm. Utilizing these housing dimensions, the viewing aperture 20 would be a rectangular hole for viewing the image 24, approximately 32.99 mm by 47.39 mm.

The housing 26 is provided with computer control means permitting the user 16 to interface with a computer 22 to which the display 12 is operably connected. The control means generally includes a computer mouse 41 and a microphone/speaker 42, both operably connected to the housing 26. The computer mouse 41 is preferably formed on the front wall 28 of the housing 26, and includes a mouse control 44 and mouse buttons 46. The mouse control 44 includes a knob 48 projecting from the front wall 28 of the housing 26 with a track ball 50 universally rotatable within the knob 48. It should be understood that other configurations of the control means are also contemplated.

The microphone/speaker 42 is also preferably formed on the housing 26 and can be advantageously used by any user requiring simultaneous access to both audio and video information. Further, the microphone/speaker 42 permits the user 16 to interface with and control operation of the computer 22, which includes an audio interface 52 (see FIG. 1) permitting such use.

The display 26 also includes a switch 54 preferably disposed on the housing 26. The switch 54 is selectively variable between first and second states enabling either the computer mouse 41 or the microphone/speaker 42 to be utilized to control operation of the computer 22.

Referring more particularly to FIG. 3, the housing 26 generally at least partially encloses an image forming means shown generally at 56. The image forming means 56 receives a video signal with video information from the computer 22 and displays the video information as a display image 24 into the line of sight of an observer/user 16. The display image 24 is viewable by the observer/user 16 through the viewing aperture 20.

More specifically, the image forming means 56 generally includes an LCD or electroluminescent display 58, a beam splitter 60 and a spherical mirror 62. The image forming means 56 operates according to the same general principles as disclosed in prior application Ser. No. 08/697,035 filed by one of the named inventors herein, the disclosure of which is herein incorporated by reference. Accordingly, a detailed description of the operation of the image forming means 56 is not necessary.

It should be understood that the present invention is not limited to the above-mentioned image forming means 56 or its specific components. Many other electronic displays could be utilized as the image forming means 56. These include such displays as miniature CRT's, electroluminescent displays, field emission displays, raster displays and others that are currently being developed.

Figure 5:
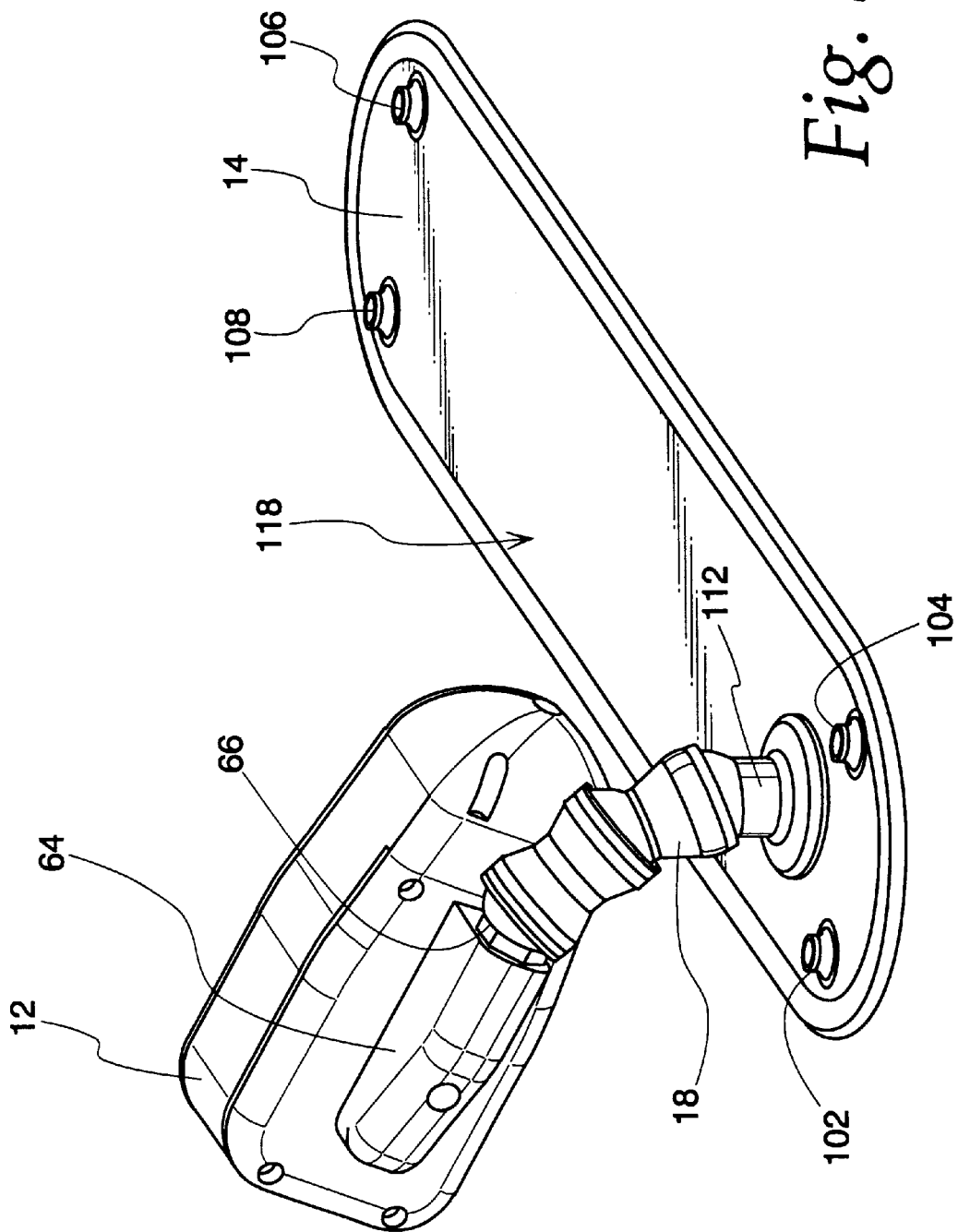
FIG. 5 is a perspective view of the display, flexible element and garment operably connected together and further including a member releasably securing the display to the flexible element.
Figure 6:
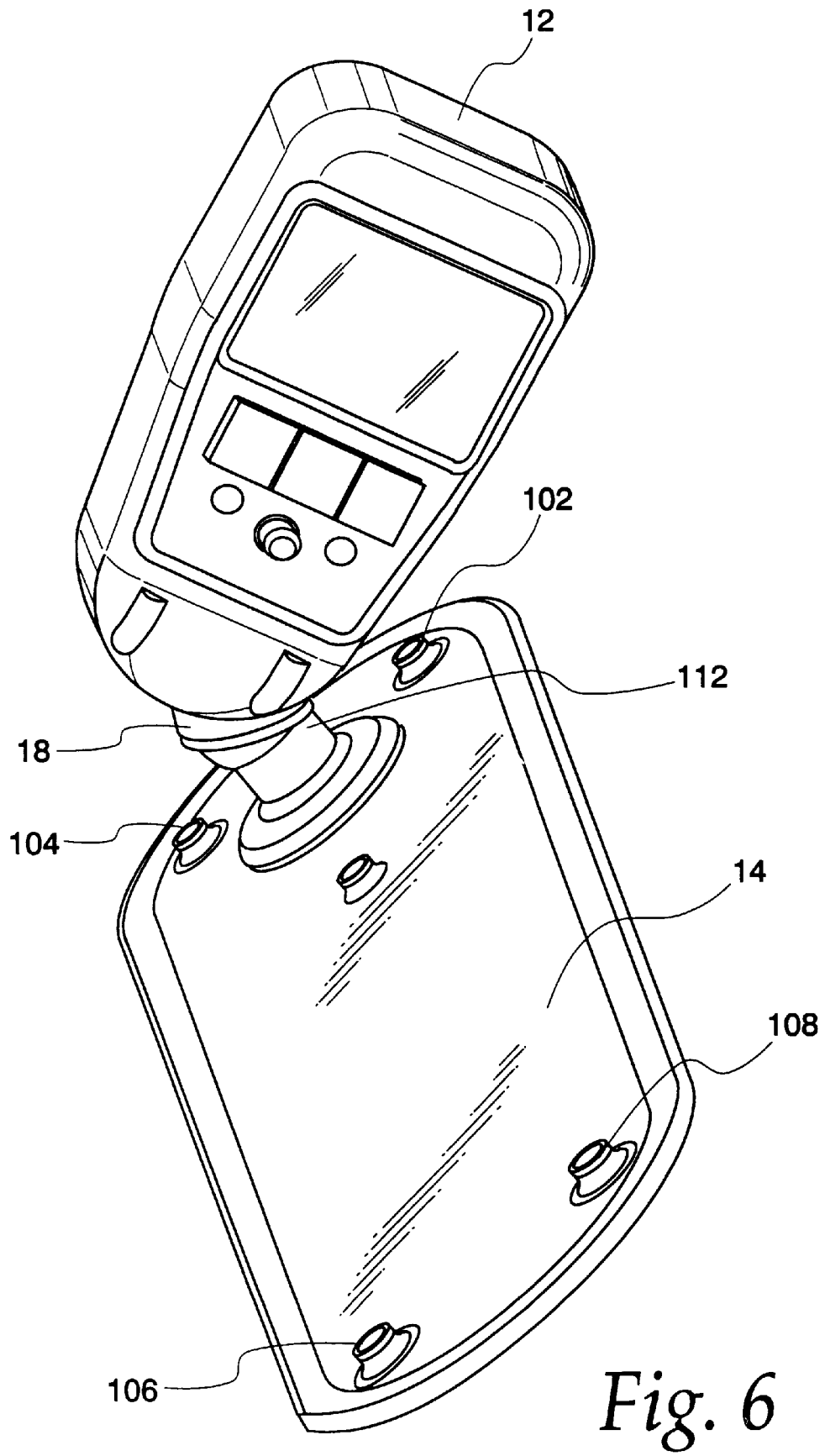
FIG. 6 is the perspective view of the display, flexible element and garment of FIG. 5 taken from a different viewing position.

Referring now to FIGS. 5–6, the display 12 is shown operably connected to the garment 14 via the flexible element 18. In a preferred embodiment, the flexible element 18 is made of black Delrin™ plastic and includes a gooseneck support. However, any type of flexible element permitting universal repositioning of the display 12 relative to the garment 14 may be utilized without departing from the spirit and scope of the present invention.

The display 12 is detachably secured to the flexible element 18 via a member 64 which is attached to an end 66 of the flexible element 18. In a preferred form, the member 64 is also made of black Delrin™ plastic and is snap fit into the end 66 of the flexible element 18. However, other connection methods may also be used.

The member 64 is shown more particularly in FIGS. 7–9 and includes an angled top surface 68 and a substantially flat bottom surface 70. An end wall 72 includes a bore 74 which receives the end 66 of the flexible element 18 when the member 64 is attached thereto. The bottom surface 70 includes a slot 76 defined therein. The slot 76 is defined by side walls 78,80, having a dove-tail configuration, and an end wall 82. The bottom surface 70 of the member 64 within the slot 76 includes a plurality of spaced bumps/protrusions 84, the significance of which will become apparent.

As shown more clearly in FIGS. 3 and 10, the housing 26 includes a raised tab 84 formed on the back wall 30. The raised tab 84 is defined by an outer wall 86 and side walls 88,90, with the side walls 88,90 having a dove-tail configuration. The outer wall 86 includes a plurality of indentations 92 at spaced intervals along the length thereof. Attaching the display 12 to the member 64 consists of guidingly receiving the raised tab 84 into the slot 76. The corresponding bumps 84 and indentations 92 engage as the raised tab 84 is slid into the slot 76. The protrusions 84 and indentations 92, in combination, provide a detent means securing the display 12 in a plurality of positions relative to the member 64. Side movement of the display 12 relative to the member 64 is prohibited by the dove-tail connection between side walls 78,80 of the member 64 and side walls 88,90 of the raised tab 84. The above attachment method permits a user 16 to readily remove the display 12 from and/or replace the display 12 on the member 64, depending upon the type of application required.

Referring now to FIGS. 11–13, the garment 14 of the body-mountable display system 10 will now be described. The garment 14 includes a sheet of high density polyethylene 94 disposed in between nylon sheets 96. The garment 14 is depicted as oval in shape, and its outer perimeter includes an acrylic awning canvas edging 98 holding the garment 14 together. The edging 98 may be attached by stitching or other conventional means.

The garment 14 is generally both rigid and flexible in that it will generally conform to and overlie a substantial area on a portion of the body of the user 16. However, once conformed to a position, the garment 14 is designed to generally remain in that position until it is reconformed to a different position. The garment depicted in FIGS. 11–13 generally fits conveniently over the shoulder of a user and conforms to the shape thereof.

The garment 14 includes an aperture 100 which is designed to attach to the flexible element 18 as will be described hereinafter.

In the particular embodiment depicted in FIGS. 11–13, eyelets 102,104,106,108 are secured to the garment 14 at optimum positions for securing the garment 14 to the body of the user 16 via straps 110, shown more particularly in FIG. 1. More specifically, if the garment 14 depicted in FIG. 11 were placed over the right shoulder of a user 16, the eyelets 102 and 108 would be connected via a strap 110 running under the right arm of the user 16, while the eyelets 104 and 106 would be connected via a strap 110 running across the chest, under the left arm and across the back of the user 16.

It should be understood that the garment 14 disclosed herein is merely one of a myriad of types of garments that are contemplated with the present invention. The garment may comprise a variety of shapes and sizes and may include, but by no means is meant to be limited to, such items as shoulder straps, vests, belts, shirts, arm straps, etc. Furthermore, the garment 14 may also be designed to be removably attached to the body of a user 16. In this instance, the garment may be inserted into a pocket or slot on a vest or jacket of the user, or may alternatively include means, such as Velcro™-type fasteners or dual locking snaps, for releasable attachment to a jacket or vest of a user 16.

Figure 16:
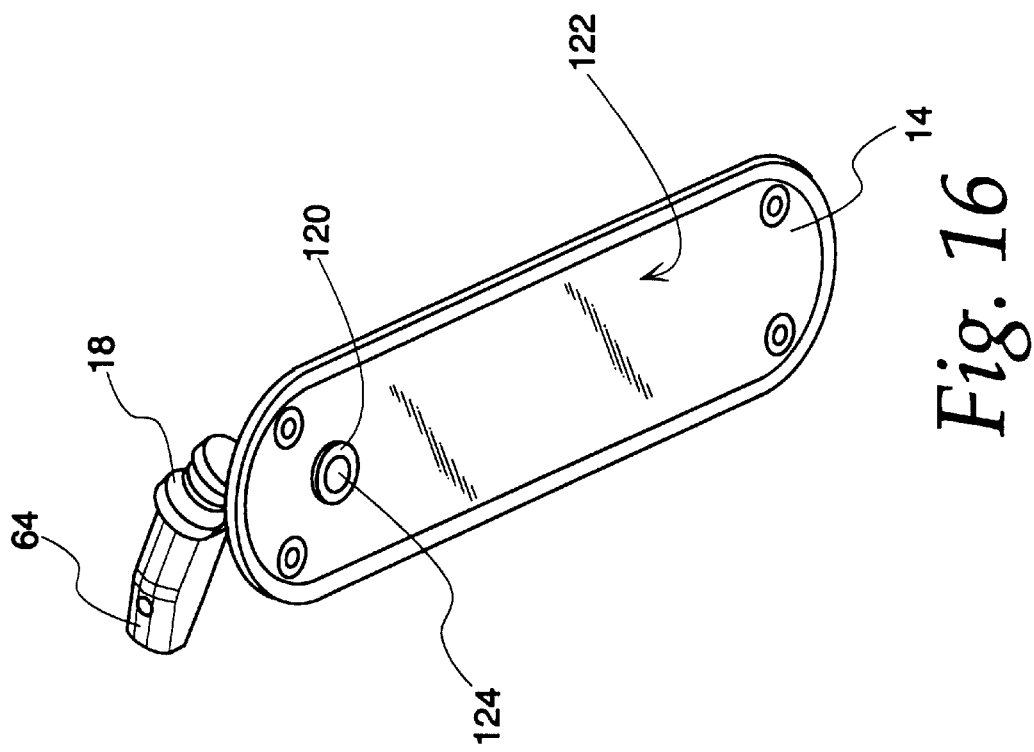
FIG. 16 is a perspective view of the display system of FIG. 5 taken from a viewing position at the underside of the garment, with the display omitted.
Figure 15:
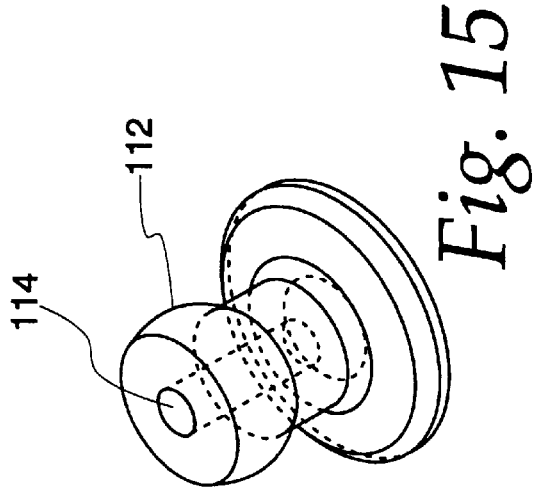
FIG. 15 is a perspective view of the bottom segment of the flexible element.
Figure 14:
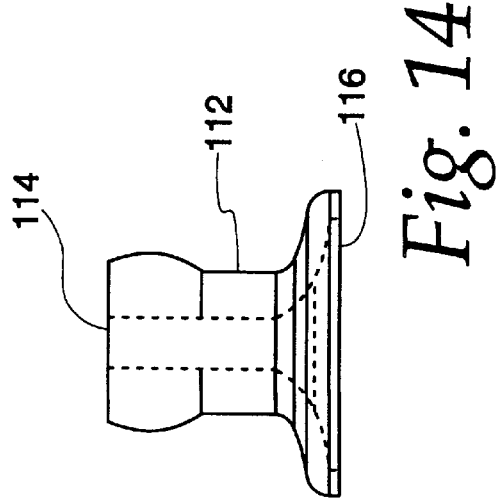
FIG. 14 is a side elevational view of a bottom segment of the flexible element.

Attachment of the flexible element 18 to the garment 14 will now be described with reference to FIGS. 14–16. The flexible element 18 has a bottom segment 112 which includes a threaded bore 114 centrally disposed therethrough. Similar to the flexible element 18, the bottommost segment 112 is made of a black Delrin™ plastic. The segment 112 includes a bottom surface 116, which when operably mounted, engages a surface 118 of the garment 14 with the bore 114 substantially aligned with the aperture 100. A washer 120 is disposed on a surface 122 of the garment 14 opposite that of surface 118, with the washer 120 having a diameter larger than the diameter of the aperture 100. A screw 124 is passed through the washer 120 and is screwed into the bore 114 in the segment 112. The screw 124 is tightened to an appropriate tightening torque sufficient to maintain the bottom surface 116 of the segment 112 flush against the surface 118 of the garment 14. It should be noted, however, that other methods of mounting the flexible element 18 to the garment 14 are also contemplated by the present invention.

Figure 17:
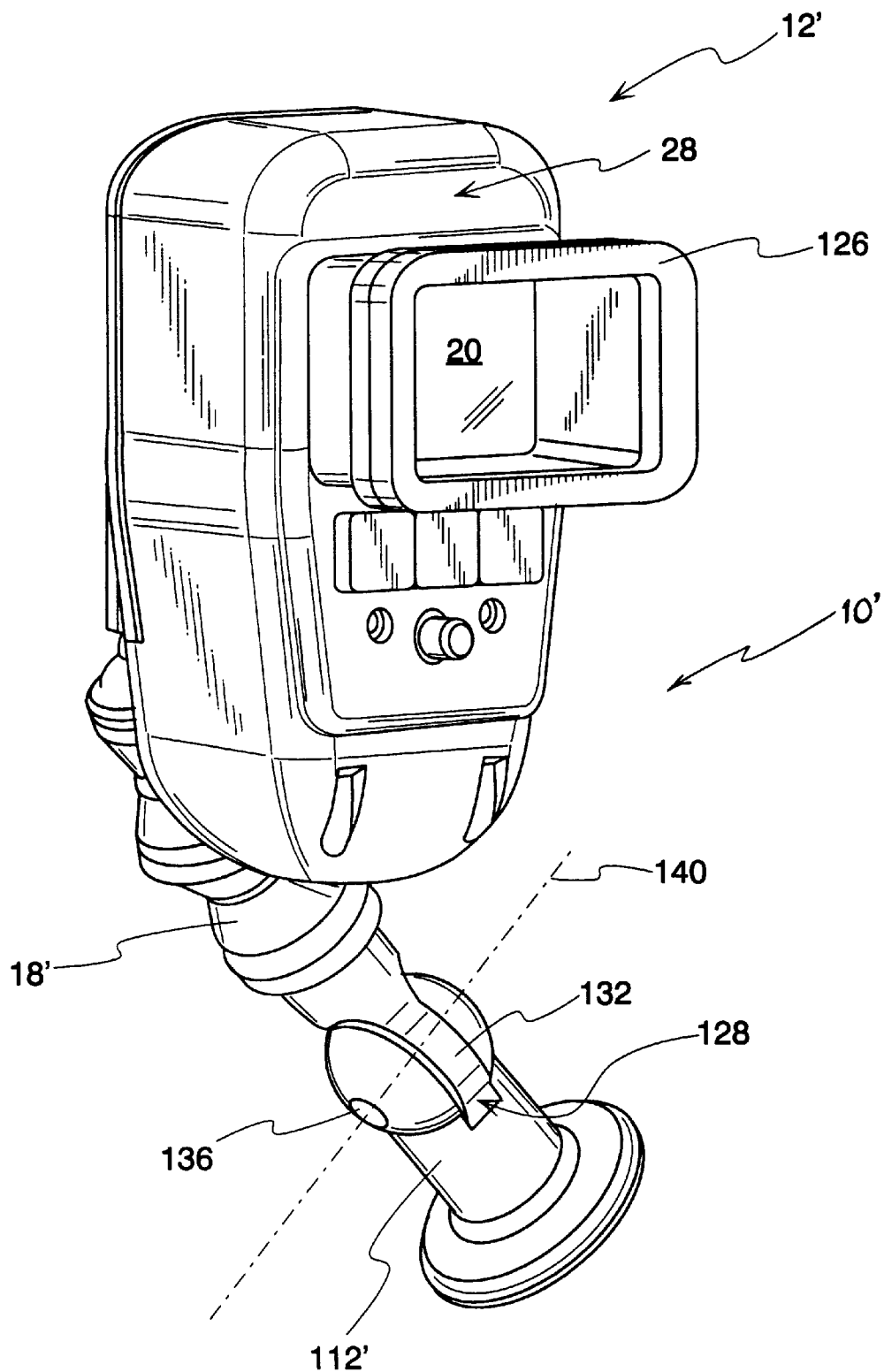
FIG. 17 is a perspective view of an alternative embodiment of the display and flexible element.

FIGS. 17–20 depict an alternative embodiment of the display system 10' with like elements indicated by the same reference numbers and elements which have been slightly modified indicated with a prime ('). As shown in FIG. 17, the display 12' has been modified to include a shroud 126 disposed around the outer periphery of the viewing aperture 20 and extending from the front wall 28. The shroud 126 may be provided to reduce the effects of the sun or to limit the line of sight range to the viewing aperture 20.

Figure 18:
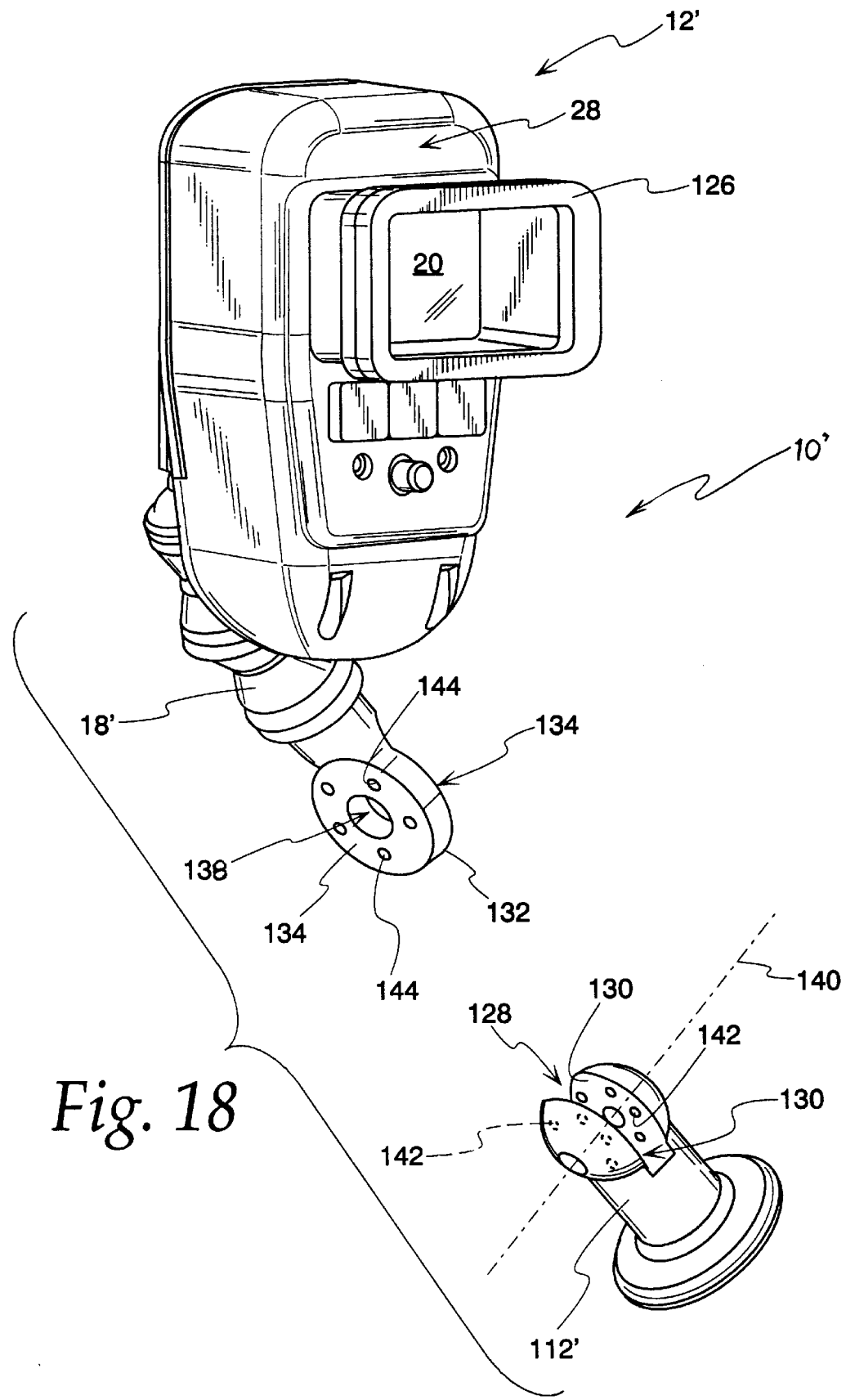
FIG. 18 is a perspective view of the display and flexible element of FIG. 17, with the flexible element removed from a base segment.

As shown more clearly in FIG. 18, the bottommost segment or base element 112' of the flexible element 18' includes a channel 128 defined by interior spaced side walls 130. The flexible element 18' includes a disc-shaped element 132 at its lower end having oppositely facing walls 134. The disc-shaped element 132 is received in the channel 128 and is pivotably attached thereto via pin 136 which extends through a central bore 138 in the disc-shaped element 132. After attachment, the display 12' and flexible element 18' are pivotable between in-use and storage positions about axis 140 (see FIGS. 19 and 20).

Detents 142 may be provided on the interior side walls 130 and are designed to operably engage corresponding raised members 144 formed on the oppositely facing side walls 134 of the disc-shaped member 132 with the disc-shaped member 132 received in the channel 128. The raised members 144 and detents 142 frictionally engage to hold the display 12' in place in a plurality of different pivot positions. Further, the flexible element 18' may be universally movable enabling the user 16 (FIGS. 19–20) to place the display 12' in an infinite number of viewing positions in each different pivot position. While FIG. 18 depicts the detents 142 on the bottommost segment 112' and the raised members 144 on the disc-shaped member 132, it should be understood that the detents 142 may be provided on the disc-shaped member 132 and the raised members 144 provided on the bottommost segment 112' without departing from the spirit and scope of the present invention.

Figure 20:
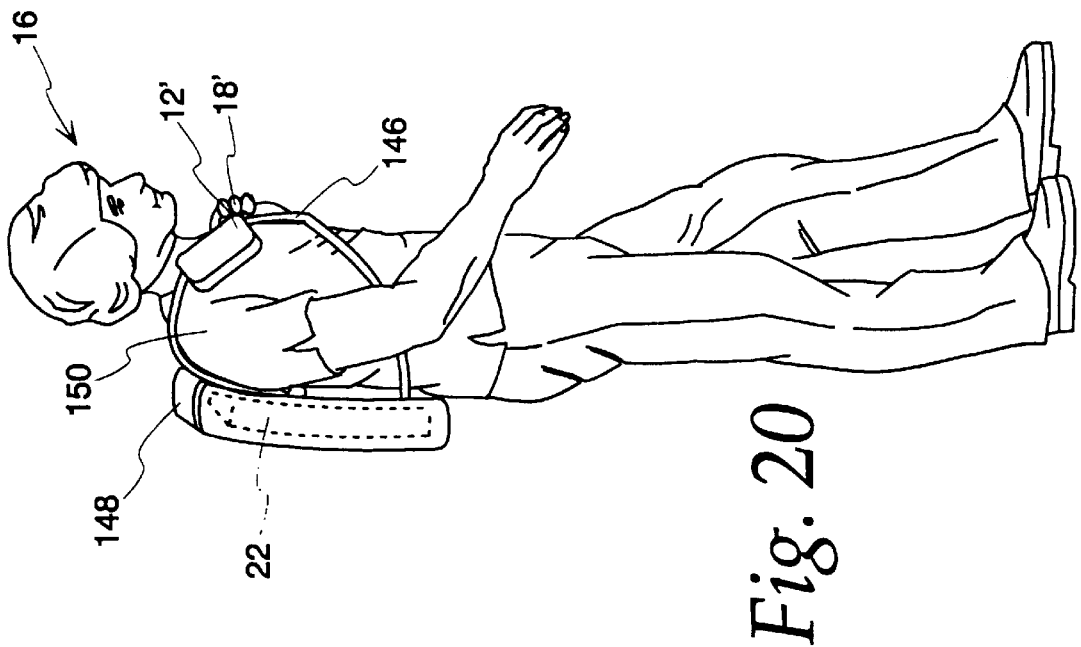
FIG. 20 is a perspective view of the display and flexible element of FIG. 17 attached to a garment wearable by a user, with the display in a stowed position.
Figure 19:
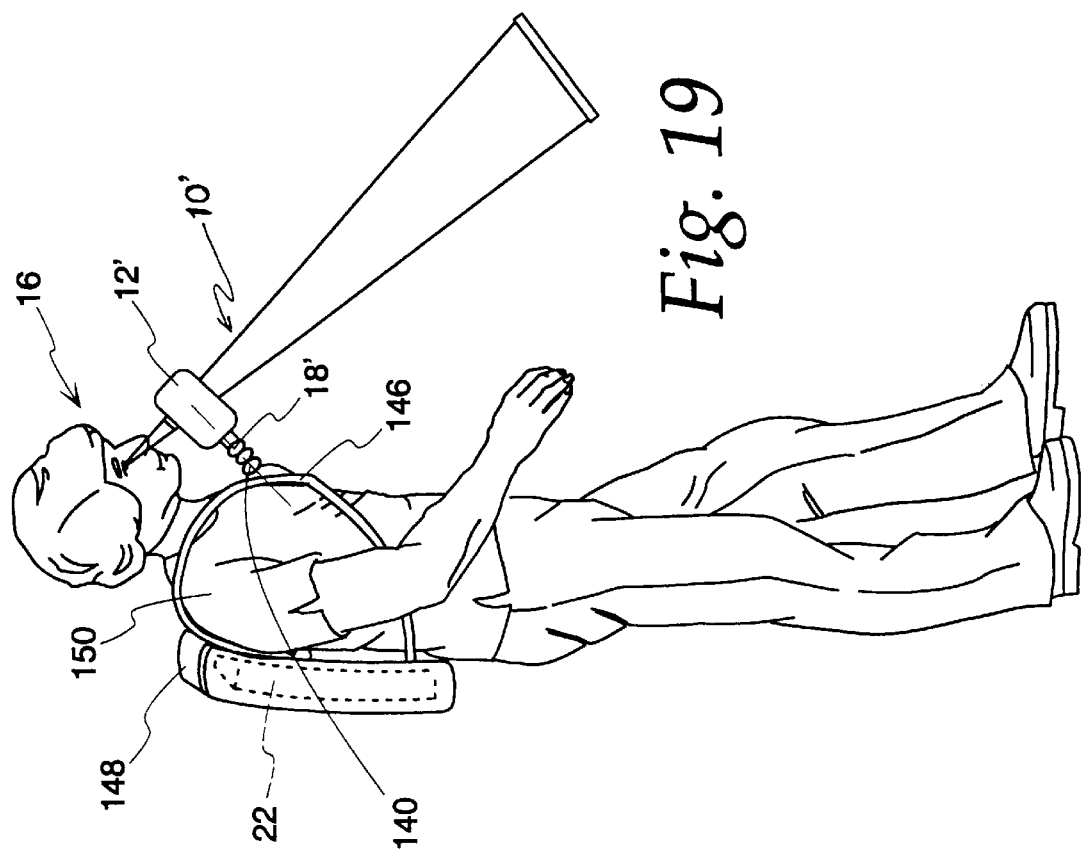
FIG. 19 is a perspective view of the display and flexible element of FIG. 17 attached to a garment wearable by a user, with the display in an in-use position.

FIGS. 19–20 depict the display 12' in in-use and stowed/storage positions, respectively. The display 12' is shown attached to a strap 146 of a backpack garment 148 wearable by the user 16. The computer 22, which operably interfaces with a display 12', may preferably be displaced within the backpack 148.

In use, the user 16 may grasp the display 12' and/or flexible element 18' and pivot and/or universally move the display 12', via the flexible element 18', to a comfortable viewing position as shown in FIG. 19. When the user 16 no longer desires or needs to view the viewing aperture 20, the display 12' may be pivoted about the axis 140 to a storage or stowed position as shown in FIG. 20. In the stowed position, the display 12' is preferably displaced up against the shoulder 150 of the user 16, generally out of the way, thereby enabling the user 16 to perform a variety of tasks without interference from the display 12'.

Referring now to FIG. 21, yet another alternative embodiment of the display system 10" is depicted, with like elements indicated by the same reference numbers and elements requiring slight modification indicated by a double prime ("). In the embodiment shown in FIG. 21, the display 12" may be attached to the strap 146 of the backpack garment 148 by either of the flexible elements 18 or 18'. The display 12" includes the viewing aperture 20 and may or may not include the shroud 126 and/or microphone/speaker 42. A computer mouse 41", including a mouse control 44" and mouse buttons 46", is operably attached to the strap 146 of the backpack 148. Accordingly, after placing the display 12" in a comfortable viewing position, the user 16 can interface with the computer 22 contained in the backpack 148, via computer mouse 41", without having to physically make contact with the display 12". This aids in helping to prevent the display 12" from being moved or knocked out of a comfortable viewing position and having to be adjusted. It should be noted that while the computer mouse 41" is shown attached to the same strap 146 as the display 12", the computer mouse 41" and display 12" may be attached to opposite straps 146 or other type garments without departing from the spirit and scope of the present invention.

Furthermore, nonelectric versions are also contemplated. For example, a passive display consisting of a transparency in either an artificial 'light or sunlight can replace the LCD 58 and generate the required image. Applications could include high resolution maps, photographic slides, or microfiche reference sources.

Other aspects, objects and advantages of the present invention can be obtained from a study of the drawings, disclosure and appended claims.

What is claimed is:

1. A body-mountable display system comprising:
   first means for receiving an input signal and producing a video output in response thereto;
   a garment wearable by a user; and
   second means for pivotably connecting the first means to the garment to allow the first means to be pivotable between in-use and storage positions relative to the garment,
   said body-mountable display system in combination with a computer that produces an input signal that is received by the first means, wherein the video output includes a cursor for selectively controlling operation of the computer,
   wherein the second means comprises a connecting element having spaced ends with one end pivotably mounted to the garment and the other end including means for detachably mounting the first means to the connecting element.

2. The body-mountable display system of claim 1, wherein said one end of the connecting element includes a disc-shaped element having oppositely facing side walls and a central bore, the disc-shaped element operatively received in a channel defined by facing side walls formed in a base element attached to the garment, and pivotably mounted to the base element via a pin extending through the central bore and secured to the base element.

3. The body-mountable display system of claim 2, further comprising means operatively associated with the connecting element and garment for operatively securing the first means in a plurality of different pivoting positions relative to the garment.

4. The body-mountable display system of claim 3, wherein the securing means comprises:
   a plurality of detents formed in one of the facing side walls of the base element and the oppositely facing side walls of the disc-shaped element; and
   a plurality of raised members formed in the other of the facing side walls of the base element and the oppositely facing side walls of the disc-shaped element,
   said plurality of detents and plurality of raised members cooperating during pivoting of the first means to frictionally secure the first means in a plurality of different pivoting positions relative to the garment.

5. The body-mountable display system of claim 3, wherein the connecting element comprises a flexible element universally repositionable to place the first means in an infinite number of different positions relative to the garment in each of the different pivoting positions.

6. The body-mountable display system of claim 5, wherein the flexible element comprises a gooseneck support.

7. A body-mountable display system comprising:
   first means for receiving an input signal and producing a video output in response thereto;
   a garment wearable by a user; and
   second means for pivotably connecting the first means to the garment to allow the first means to be pivotable between in-use and storage positions relative to the garment,
   said body-mountable display system in combination with a computer that produces an input signal that is received by the first means, wherein the video output includes a cursor for selectively controlling operation of the computer, wherein the first means comprises a hand-holdable portable display comprising:
      a housing having a viewing aperture for viewing the video output; and
      a computer mouse formed on the housing for selectively controlling the video output and operation of the computer.

8. The body-mountable display system of claim 7, wherein the housing comprises a front wall at which the viewing aperture is defined, and wherein the portable display further includes a shroud disposed about an outer periphery of the viewing aperture and projecting from the front wall.

9. A body-mountable display system comprising:
   first means for receiving an input signal and producing a video output in response thereto;
   a garment wearable by a user;
   second means for pivotably connecting the first means to the garment to allow the first means to pivotable between in-use and storage positions relative to the garment, said body-mountable display system in combination with a computer that produces an input signal that is received by the first means, wherein the video output includes a cursor for selectively controlling operation of the computer; and
   a computer mouse formed on the garment for selectively controlling the video output and operation of the computer, said computer mouse comprising:
      a track ball for universal positioning of the cursor on the video output; and
      a touch pad engageable by a user for activating the computer to perform functions relating to a location of the cursor on the video output.

10. A body-mountable display system comprising:
    first means for receiving an input signal and producing a video output in response thereto;
    a garment wearable by a user;
    second means for pivotably connecting the first means to the garment to allow the first means to pivotable between in-use and storage positions relative to the garment, said body-mountable display system in combination with a computer that produces an input signal that is received by the first means, wherein the video output includes a cursor for selectively controlling operation of the computer; and
    a computer mouse operably connected to the garment for selectively controlling the video output and operation of the computer, wherein the garment comprises a backpack having straps engageable by a user for operatively securing the backpack thereto, and wherein the computer mouse is formed on one of the straps.

11. The body-mountable display system of claim 10, wherein the computer is disposed in the backpack.

12. The body-mountable display system of claim 10, wherein the first means is pivotably connected to one of the straps via the second means.

13. In a display system for receiving a video signal produced by a computer and displaying video information generated by the video signal from the computer as a display image, the display image including a cursor for selectively controlling operation of the computer, the improvement comprising:

a display for viewing the display image;

a garment wearable by a user;

means for operatively mounting the display to the garment to allow the display to be selectively repositionable relative to the garment; and manual control means operably connected to the garment for selectively controlling the display image and operation of the computer, wherein the manual control means comprises a computer mouse formed on the garment.

14. The improvement of claim 13, wherein the computer mouse comprises:

a track ball for universal positioning of the cursor on the video output; and a touch pad engageable by a user for activating the computer to perform functions relating to a location of the cursor on the video output.

15. The improvement of claim 13, wherein the garment comprises a backpack having straps engageable by a user for operatively securing the backpack thereto, and wherein the computer mouse is operatively connected to one of the straps.

16. The improvement of claim 15, wherein the computer is disposed in the backpack.

17. The improvement of claim 15, wherein the display is operatively mounted to one of the straps and selectively repositionable relative to the backpack.

18. In a display system for receiving a video signal produced by a computer and displaying video information generated by the video signal from the computer as a display image, the display image including a cursor for selectively controlling operation of the computer, the improvement comprising:

a display for viewing the display image;

a garment wearable by a user;

means for operatively mounting the display to the garment to allow the display to be selectively repositionable relative to the garment; and manual control means operably connected to the garment for selectively controlling the display image and operation of the computer, wherein the mounting means comprises a flexible element having spaced ends with one end attached to the garment and the other end including means for detachably mounting the display to the flexible element, said flexible element universally repositionable to place the display in an infinite number of different positions relative to the garment, wherein the display comprises a hand-holdable portable display, the garment comprises a backpack having straps engageable by a user for operatively securing the backpack thereto, the manual control means is operably connected to one of the straps, and said one end of the flexible element is operatively attached to one of the straps.

19. The improvement of claim 18, wherein said one end of the flexible element is pivotally attached to said one of the straps to allow pivoting movement of the display relative to the backpack.

20. The improvement of claim 19, wherein the manual control means comprises a computer mouse formed on said one of the straps.

* * * * *